United States Patent

Sturhan

[15] 3,645,488
[45] Feb. 29, 1972

[54] VEHICLE SEAT CONSTRUCTION

[72] Inventor: Klaus Sturhan, Lemgo/Lippe, Germany

[73] Assignee: Gebr. Isringhausen, Lemgo/Lippe, Germany

[22] Filed: Apr. 10, 1970

[21] Appl. No.: 27,264

[30] Foreign Application Priority Data

June 21, 1969 Germany..................G 69 24 745

[52] U.S. Cl. .................................................248/399
[51] Int. Cl. .................................................F16m 11/00
[58] Field of Search ........................248/350, 399, 400

[56] References Cited

UNITED STATES PATENTS

| | | | |
|---|---|---|---|
| 3,144,270 | 8/1964 | Bilancia | 248/399 X |
| 3,061,260 | 10/1962 | Simons et al. | 248/399 |
| 3,075,736 | 1/1963 | Freedman | 248/400 |
| 2,682,295 | 6/1954 | Hickman | 248/400 |

*Primary Examiner*—William H. Schultz
*Attorney*—Michael S. Striker

[57] ABSTRACT

An upper support is upwardly spaced above a lower support and movable towards and away from the same. A connecting means connects the supports with one another with freedom of movement of the upper support relative to the lower support. First damping means continuously acts upon the upper support for damping movement of the same relative to the lower support. Second damping means is activated at the will of the user for damping movements of the upper support with reference to the lower support in conjunction with and in addition to the action of the first damping means.

9 Claims, 2 Drawing Figures

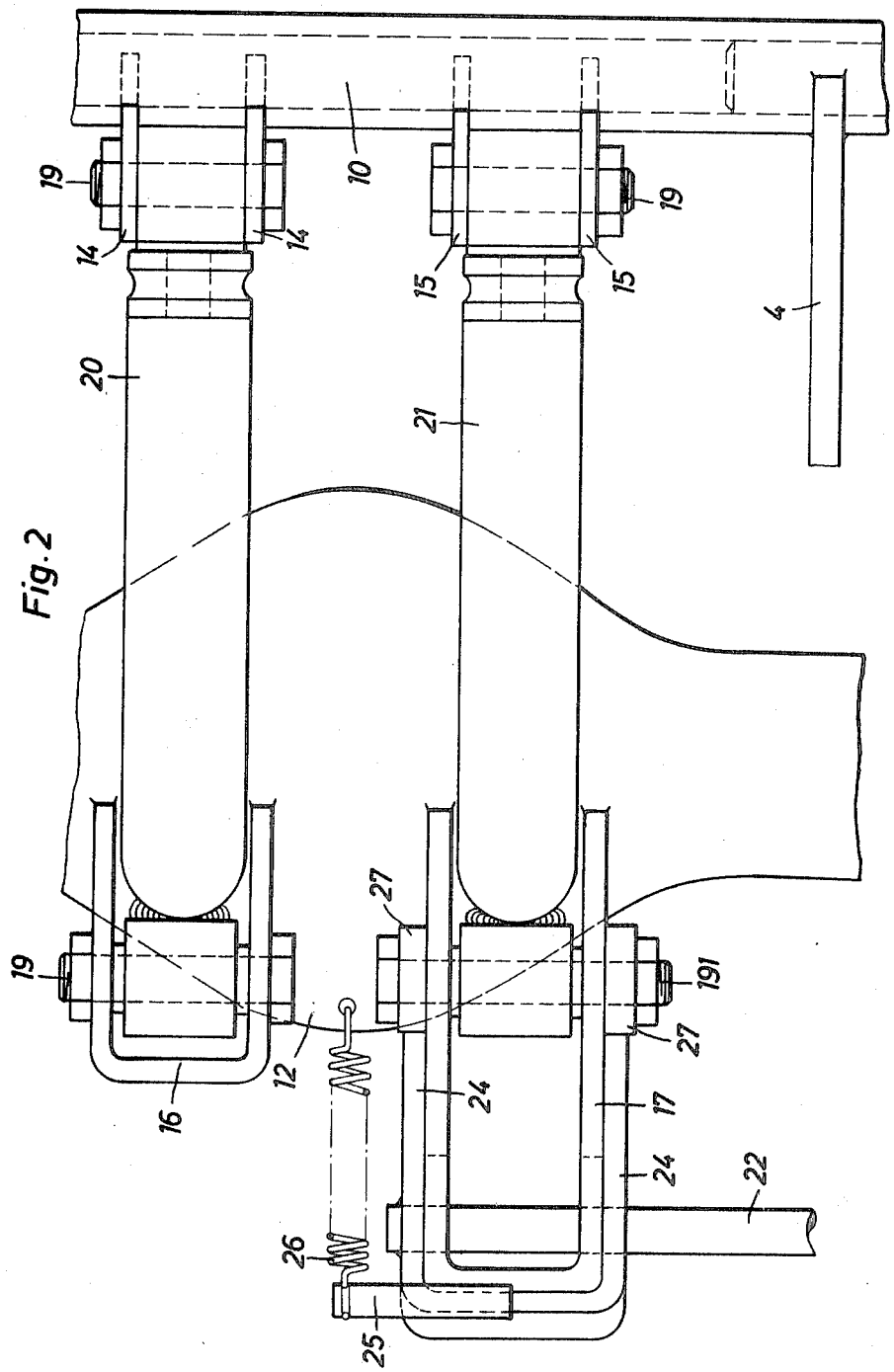

3,645,488

VEHICLE SEAT CONSTRUCTION

BACKGROUND OF THE INVENTION

The present invention relates generally to vehicle seat constructions, and more particularly to vehicle seats provided with vibration-damping means.

It is known to construct vehicle seats in such a manner that the seat itself—with or without the seat back—may oscillate or reciprocate with reference to a support against a biasing force. The purpose is to increase the comfort of a passenger using the seat. Conventionally the biasing force is applied by a single damping device, such as a hydraulic dashpot or the like.

It has been found, however, that it is very difficult to so dimension a single dashpot or damping device as it will be generally called hereafter, that it provides for optimum spring action and damping of the movements of the seat with reference to the support, under all driving conditions and all types of vehicles. Evidently, if the damping effect provided for by the device is relatively weak, then the seat will be permitted to perform excessively large movements when the vehicle traverses rough and uneven terrain. On the other hand, if the terrain is smooth and the damping device provides a relatively great damping effect, then the spring effect is frequently not sufficient to afford the passenger the desired comfort.

SUMMARY OF THE INVENTION

It is, accordingly, an object of the present invention to overcome the aforementioned disadvantages.

More particularly it is an object of the present invention to provide an improved seat construction which is not possessed of these disadvantages.

Still more specifically it is an object of the present invention to provide a seat construction having two damping devices one of which is continuously in operation and the other of which can be selectively put into and out of operation at the will of a user.

In pursuance of the above objects, and others which will become apparent hereafter, one feature of the invention resides in a vehicle seat which, briefly stated, comprises a lower support and an upper support spaced above and movable towards and away from the lower support. Connecting means connects the upper support with the lower support with freedom of movement of the upper support relative to the lower support. First damping means acts upon the upper support and is permanently operative for damping the movements of the same with reference to the lower support.

In accordance with the invention there is further provided second damping means activatable at the will of a user for damping the movements of the upper support with reference to the lower support in conjunction with and in addition to the first damping means.

Advantageously the activation and deactivation of the second damping means is effected manually via an activating arrangement which, once moved to operative position, results in activation of the second damping means in automatic response to reaching or exceeding of a certain amplitude of movement of the upper support with reference to the lower support.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a fragmentary plan view of the embodiment illustrated in FIG. 1, with the upper support and associated components thereof removed for clarity.

DESCRIPTION OF THE PREFERRED EMBODIMENTS

Figure 1:
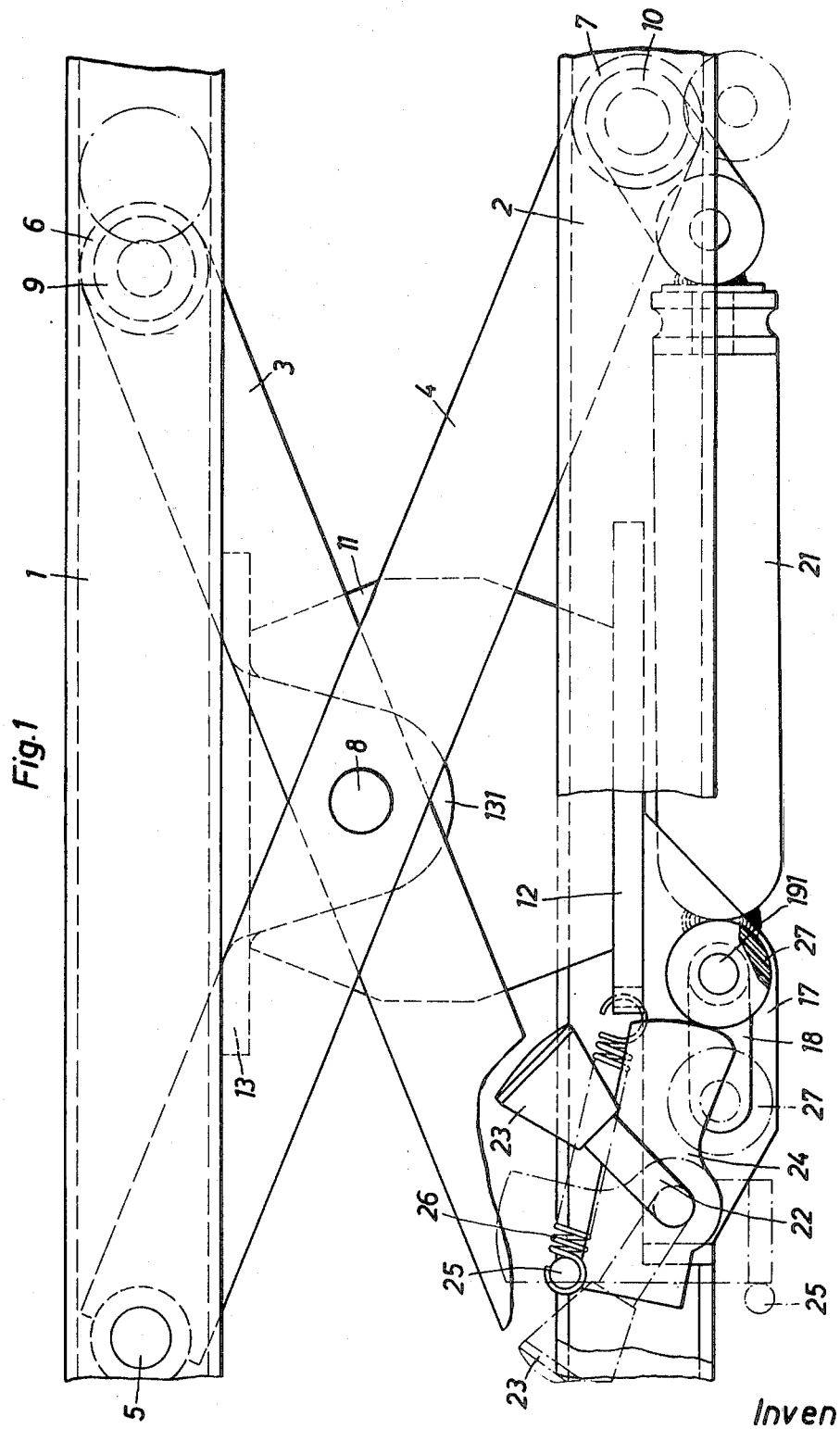
FIG. 1 is a fragmentary partly broken away side-elevational view illustrating an embodiment of the present invention.

Discussing now the drawing in detail it will be seen that the illustrated vehicle seat comprises an upper frame and, downwardly spaced therefrom a lower frame. The upper frame carries the actual seat, that is the upholstery which is conventional in vehicle seats. Such upholstery is not illustrated. Both the upper and the lower frame are provided with U-profiled rails 1 and 2 extending lengthwise at opposite lateral sides, and lengthwise in the direction of movement of the vehicle in which such a seat is installed. Connecting means are provided in form of crossing levers 3 and 4 which intersect one another in the manner of scissors, and at least two such pairs are provided transversely spaced from one another and located at the opposite longitudinal sides of the upper and lower frames. The levers 3 and 4 of each pair are connected where they cross one another for pivotal movement with respective pivot members 8. One end of each of the levers is fast with the respective rails 1 and 2 and pivotable about an axis 5, and the opposite end is provided with rollers 6 and 7 and not only pivotable but also slidably guided in the opposite rails 1 and 2. The pair of levers 3 and 4 of one side is connected with the pair of levers 3 and 4 of one other side by transverse connecting rods 9 and 10 to which pass through the axis for the rollers 6 and 7.

The construction illustrated and described until now is already known and requires no elaboration, particularly because it does not in itself constitute a part of the present invention.

In order to permit springy but damped movement of the upper frame with reference to the lower frame there is provided a known hollow rubber spring 11 whose lower end abuts against a plate secured between the transversely spaced U-profiled rails. The upper end of the spring 11 abuts against the plate 13 which is connected with the pivots 8 of the transversely spaced pairs of levers 3, 4 by means of the downwardly bent portions 131 of the plate 13. When the upholstered seat and therefore the upper frame moves downwardly towards the lower frame, the rubber spring 11 is compressed via the pivot 8 and the plate 13 against the lower plate 12, simultaneously being expanded radially outwardly to take up the stresses which it must absorb. Thereupon, and in response to subsequent relaxation of the spring 11, the latter returns the upper frame to its uppermost position.

A pair of downwardly inclined lugs 14 and 15 are secured on the transverse rod 10, by welding or the like. Further, two U-shaped or analogously configurated brackets 16 and 17 are secured below the plate 12, and circular holes are provided in the arms of the bracket 16 whereas the bracket 17 is provided with elongated holes or slots 18. A known dashpot, preferably of hydraulic type, is identified with reference numeral 20 and the bolt 19 or analogous means thereof passes through the circular holes of the lugs 14 and the bracket 16.

Again, to this point the seat construction heretofore described and illustrated is known. It was already pointed out before that such feats utilizing a single damping device, namely the dashpot 20, are not novel.

In order to overcome the disadvantages of these known constructions the present invention provides an additional damping device, here illustrated as a hydraulic dashpot 21. A bolt 19 of this damping device 21 passes through circular holes in the lugs 15 which are provided for this purpose on the shaft 10, being secured thereto by welding or analogous manner in the same sense as the lugs 14. At the opposite end of the dashpot 21 there is provided an additional bolt 191 which is guided in the elongated holes 18 of the bracket 16 for limited lengthwise displacement; it is arrestable in its inner end position which is shown in FIGS. 1 and 2.

Arresting can be affected in various different ways. In accordance with one concept of the present invention, which is illustrated in FIGS. 1 and 2, this arresting means or actuating means comprises a rod 22 of circular cross section which is turnably journaled in the end portion of the bracket 17 which extends beyond the elongated holes 18; one end of the rod 22 extends at right angles to the remainder of the rod and is provided with a knob 23 or a similar grip which can be engaged by the fingers of a user. A bifurcated member 24 is fast with the rod 22 and embraces with its projections the bracket 17. It carries a circular rod 25 which is connected to the bifurcated member 24, and located between the circular part 25 and the plate 12 carrying the hollow rubber spring 11, is a pretensioned contraction spring 27 which, when located as shown in FIG. 1, maintains the bifurcated member 24 in the position shown in FIG. 1 in broken lines. In this position the bolt 191 can freely slide lengthwise of the elongated holes 18 as the upper frame moves downwardly towards and upwardly away from the lower frame with concomitant lengthwise shifting of the transverse rod 10; it is clear from this that in this position of the bifurcated member 24 only the dashpot 20 will operate.

If for any reason, for instance because of the traversal of rough and uneven terrain, it is desired to provide for a stronger damping of the movements of the upper frame with reference to the lower frame, the user engages the knob 22 and pivots the bifurcated member (compare FIG. 1) in clockwise direction about its circular rod 23. This causes the outer engagement point 25 of the spring 26 to move beyond a dead center position so that the spring presses the projections of the bifurcated member 24 with their undersides against rollers—preferably of synthetic plastic material—27 which are turnably mounted on the bolt 191, for instance while these rollers are in the position shown in broken lines in FIG. 1. This movement of the bifurcated member 24 does not in itself cause activation of the second damping means 21. However, such activation takes place in automatic response to the first pronounced movement of the upper frame with reference to the lower frame after the bifurcated member 24 has been moved to the aforementioned position. When such a pronounced movement occurs, the bolt 191 with the rollers 27 is caused to move into the right-hand end position illustrated in FIG. 1 so that the tensioned spring 26 pivots the bifurcated member 24 to a position where it is located behind the rollers 27 and arrests the bolt 191 from movement lengthwise of the elongated hole 18. As soon as this takes place the damping action of the second damping device 21 is added to that of the first damping device 20.

It will be appreciated that to disconnect the damping device 21 when it is desired to again utilize only the damping effect of the device 20, it is simply necessary to pivot the bifurcated member 24 in counterclockwise direction to the end position illustrated in broken lines in FIG. 1. This disconnects the second damping device 21 in that it permits the bolt 191 thereof to move freely lengthwise in the elongated holes 18.

FIG. 2 shows that the damping devices 20 and 21 have identical dimensions. However, they may be of different dimensions, and therefore of different damping capabilities. It is also possible in accordance with the present invention to make one or both of the damping devices 20, 21 removable so they can be readily replaced with stronger or weaker damping devices, respectively. This might for instance be of advantage in certain applications. One such application where such a necessity could arise, or where such a capability could be at least desirable, might be a cross-country rally where the conditions to be encountered are not fully known in advance and where it may therefore be desirable to carry along in the vehicle a selection of damping devices having different damping capabilities, with different ones of these devices to be installed in dependence upon prevailing terrain conditions. Evidently, the removable mounting of the damping devices 20 and/or 21 can be accomplished in well known manner and need not be specifically described.

It will be understood that each of the elements described above, or two or more together, may also find a useful application in other types of constructions differing from the types described above.

While the invention has been illustrated and described as embodied in a vehicle seat construction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In a vehicle seat, in combination, a lower support, an upper support spaced above and movable towards and away from said lower support; connecting means connecting said upper support with said lower support with freedom of movement relative to the latter; permanently operative first damping means acting upon said upper support for damping movements of the same relative to said lower support; second damping means adjustable between an inoperative state, an operative state in which it dampens movements of said upper support relative to said lower support supplementary to said first damping means, and a standby state in which it is ready for entry into said operative state in automatic response to said upper support performing a movement of predetermined magnitude relative to said lower support; and manually operable means for placing said second damping means in and out of said inoperative state at the will of a user.

2. In a vehicle seat as defined in claim 1 said connecting means comprising pairs of crossed pivotally connected levers, with each lever having two end portions one of which is connected to one of said supports and the other of which is pivotably and slidably connected to the other of said supports for displacement in direction normal to said movement of said upper support.

3. In a vehicle seat as defined in claim 1; further comprising releasable mounting means releasably mounting said damping means permitting replacement and exchange.

4. In a vehicle seat, in combination, a lower support; an upper support spaced above and movable towards and away from said lower support in a predetermined path; connecting means connecting said upper support with said lower support with freedom of movement relative to the latter in said path; first damping means acting upon said upper support and permanently damping the movements of the same relative to said lower support; second damping means extending longitudinally of said path and having an end portion; and activating means for activating said second damping means at the will of a user, including a bracket fast with said lower support adjacent said end portion and having a slot extending transversely to said path, a connector on said end portion and slidably guided in said slot, and arresting means for arresting said connector in two respective positions in each of which it is proximal to one end of said slot.

5. In a vehicle seat as defined in claim 4, said activating means further comprising a bifurcated member pivotably journaled in said slot and including two projections, said member being pivotable to and from two settings in each of which it arrests said connector in one of said positions thereof.

6. In a vehicle seat as defined in claim 4, said connector comprising a pin, and friction-reducing roller means journaled on at least a portion of said pin.

7. In a vehicle seat as defined in claim 5, said activating means further comprising tensioned helical spring means acting upon said bifurcated member in such a manner as to extend below the pivot axis of the same when said member is in one of said settings, and above the pivot axis of said member when the same is in the other of said settings.

8. In a vehicle seat as defined in claim 5, wherein both of said damping means are hydraulic dashpots.

9. In a vehicle seat as defined in claim 5, wherein one of said damping means has a damping capacity which is different from that of the other of said damping means.

* * * * *